United States Patent
Hilberer

(10) Patent No.: US 8,776,919 B2
(45) Date of Patent: Jul. 15, 2014

(54) CLUTCH COMPRESSOR AND POWER STEERING PUMP ARRANGEMENT, AND METHOD FOR CONTROLLING THE SAME

(75) Inventor: Eduard Hilberer, Hockenheim (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 59 days.

(21) Appl. No.: 13/097,802

(22) Filed: Apr. 29, 2011

(65) Prior Publication Data

US 2013/0343908 A1     Dec. 26, 2013

Related U.S. Application Data

(63) Continuation of application No. PCT/EP2009/007696, filed on Oct. 28, 2009.

(30) Foreign Application Priority Data

Oct. 31, 2008   (DE) .......................... 10 2008 054 164

(51) Int. Cl.
*B60K 25/02* (2006.01)
*F04B 17/05* (2006.01)

(52) U.S. Cl.
USPC .............................. 180/53.8; 417/15; 417/364

(58) Field of Classification Search
USPC .................................... 180/53.8; 417/15, 364
See application file for complete search history.

(56) References Cited

U.S. PATENT DOCUMENTS

| | | | |
|---|---|---|---|
| 5,558,173 A * | 9/1996 | Sherman ..................... | 180/53.8 |
| 6,373,217 B1 | 4/2002 | Kawada et al. | |
| 6,388,565 B1 | 5/2002 | Bernhard et al. | |
| 6,668,953 B1 * | 12/2003 | Reik et al. .................... | 180/53.8 |
| 6,682,459 B1 | 1/2004 | Knight | |
| 6,845,832 B2 * | 1/2005 | Takizawa et al. ............ | 180/53.8 |
| 7,181,912 B2 * | 2/2007 | Mori ............................... | 60/616 |
| 7,428,944 B2 | 9/2008 | Gerum | |
| 7,727,115 B2 * | 6/2010 | Serkh ........................... | 477/115 |
| 8,496,450 B2 * | 7/2013 | Mellar et al. .................. | 417/379 |
| 2008/0093154 A1 * | 4/2008 | Gerum .......................... | 180/422 |

(Continued)

FOREIGN PATENT DOCUMENTS

| | | |
|---|---|---|
| DE | 27 32 913 A1 | 2/1979 |
| DE | 196 27 403 A1 | 1/1998 |

(Continued)

OTHER PUBLICATIONS

German-language translation of Japanese Office Action dated Nov. 5, 2013 (six (6) pages).

(Continued)

*Primary Examiner* — Drew Brown
(74) *Attorney, Agent, or Firm* — Crowell & Moring LLP

(57) ABSTRACT

A vehicle has a drive shaft which transmits torque onto a first drive, a clutch compressor, and a power steering pump. The power steering pump is driven by an output shaft which transmits torque from the first drive onto the power steering pump. A method is provided for controlling the power steering pump and the clutch compressor in the vehicle. An additional output shaft is provided for driving the clutch compressor. The additional output shaft is arranged on a second drive onto which torque is transmitted by the drive shaft which is driven by the engine. The additional output shaft transmits torque from the second drive onto the clutch compressor.

18 Claims, 4 Drawing Sheets

(56) References Cited

U.S. PATENT DOCUMENTS

| | | | |
|---|---|---|---|
| 2009/0314559 A1* | 12/2009 | Palitto | 180/65.22 |
| 2012/0266595 A1* | 10/2012 | Buschur et al. | 60/607 |
| 2012/0266701 A1* | 10/2012 | Yamada et al. | 74/15.82 |

FOREIGN PATENT DOCUMENTS

| | | |
|---|---|---|
| DE | 199 21 449 C1 | 1/2001 |
| JP | 2000-23301 A | 1/2000 |
| JP | 2001-18819 A | 1/2001 |
| JP | 2002-21953 A | 1/2002 |
| JP | 2003-72569 A | 3/2003 |
| JP | 2004-505837 A | 2/2004 |
| WO | WO 2006/099920 A1 | 9/2006 |

OTHER PUBLICATIONS

International Preliminary Report on Patentability & Written Opinion (Form PCT/IB/373 & Form PCT/ISA/237) dated May 3, 2011 with English translation (nine (9) pages).

International Search Report dated Jan. 26, 2010 with English translation (four (4) pages).

German Office Action dated Aug. 5, 2009 with English translation (eight (8) pages).

* cited by examiner

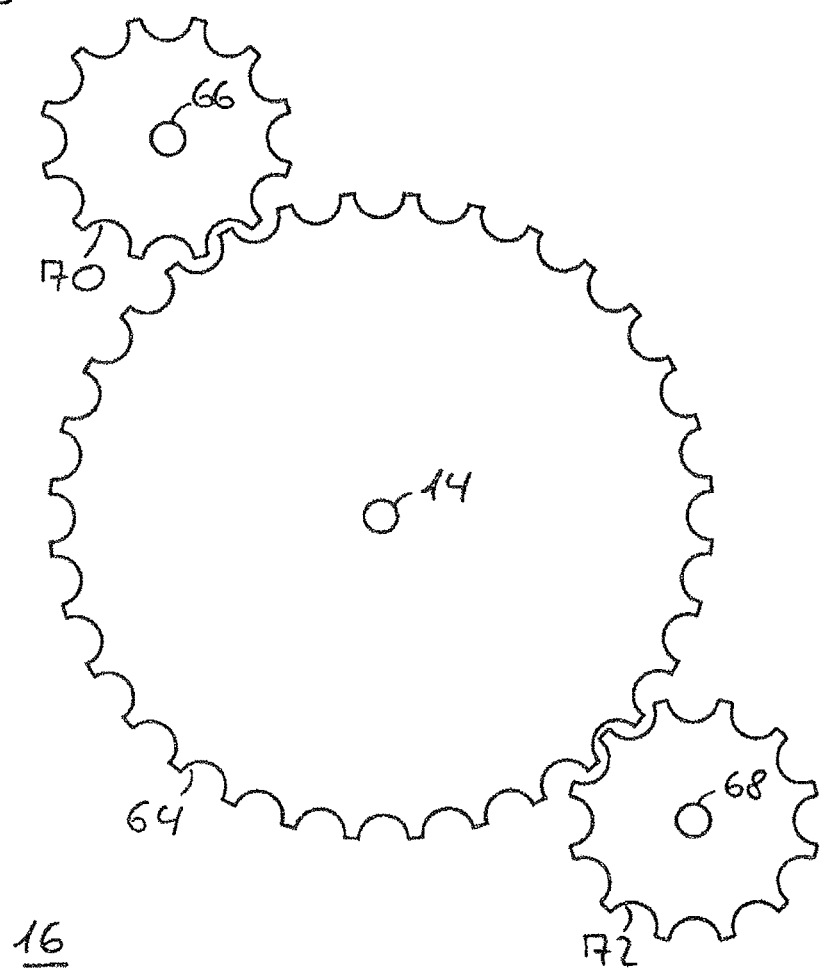

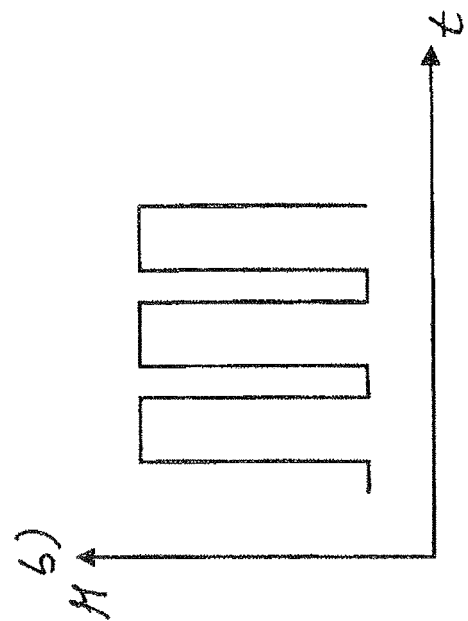
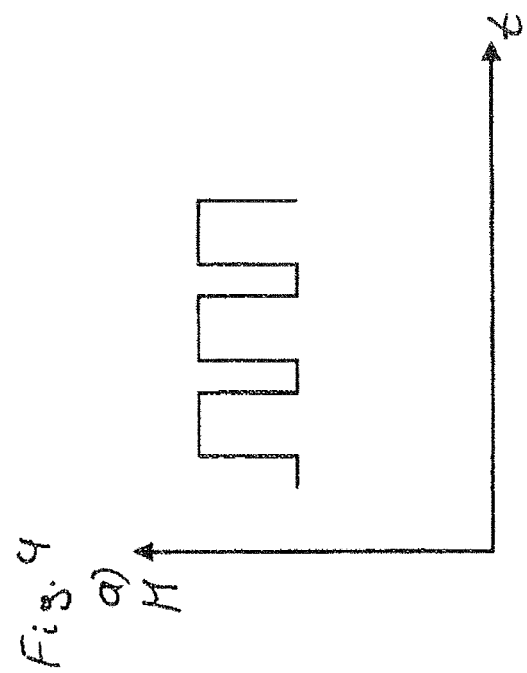
Fig. 4 a) b)

CLUTCH COMPRESSOR AND POWER STEERING PUMP ARRANGEMENT, AND METHOD FOR CONTROLLING THE SAME

CROSS-REFERENCE TO RELATED APPLICATIONS

This application is a continuation of PCT International Application No. PCT/EP2009/007696, filed Oct. 28, 2009, which claims priority under 35 U.S.C. §119 from German Patent Application No. DE 10 2008 054 164.8, filed Oct. 31, 2008, the entire disclosures of which are herein expressly incorporated by reference.

BACKGROUND AND SUMMARY OF THE INVENTION

The invention relates to a vehicle having a drive shaft that is driven by an engine and that transmits torque generated by the engine to a first drive, and having a clutch compressor and a power steering pump. The power steering pump is driven by an output shaft that transmits torque from the first drive to the power steering pump.

The invention furthermore relates to a method for controlling a power steering pump and a clutch compressor in a vehicle having a drive shaft that is driven by an engine and that transmits torque generated by the engine to a first drive, and having a clutch compressor and a power steering pump. The power steering pump is driven by an output shaft that transmits torque from the first drive to the power steering pump.

For the purpose of driving a vehicle, modern vehicles have an engine and a multiplicity of further ancillary assemblies, the interactions of which, firstly, enable the vehicle to operate reliably. Designated as ancillary assemblies in this case are all auxiliary machines of the vehicle that are driven directly or indirectly by the engine and that are necessary or helpful for the operation of the vehicle. Examples of ancillary assemblies are a water pump that supplies the engine with cooling water, a power steering pump that reduces the steering force to be applied, and a clutch compressor, present particularly in the case of commercial vehicles, for boosting the braking force applied by the driver of the vehicle.

Basically, ancillary assemblies can be divided into two categories. A first category of ancillary assemblies comprises all ancillary assemblies whose continuous operation is necessary for the operation of the engine, or of the vehicle. These ancillary assemblies include, for example, a fuel pump and the cooling water pump. A second category of ancillary assemblies comprises all ancillary assemblies that are only temporarily necessary for the operation of the engine, or of the vehicle. These include, for example, a starter, which is required only for starting the engine, the power steering pump, which is required merely for assistance in a steering motion of the vehicle, and the clutch compressor, the operation of which is necessary only when there is no longer an adequate reserve of compressed air. Ancillary assemblies that belong to the first category are usually driven directly by the engine. Ancillary assemblies that belong to the second category can be driven as required, the drive being able to be effected independently of the engine, for example in the case of the starter that starts the engine being driven, via an electric motor, by means of energy stored in a battery. Drive in this case denotes a mechanical device that transmits a torque, or force, applied at a drive shaft, to an output shaft. The drive can be, for example, a gearwheel drive, a belt drive or a chain drive.

Ancillary assemblies consume energy, and therefore contribute to the fuel consumption of the vehicle. To reduce the fuel consumption, it is therefore desirable to operate ancillary assemblies only when they are actually required. On the other hand, the continuous operation of an ancillary assembly can be advantageous, or even prescribed, in respect of safety. The power steering pump belongs to the ancillary assemblies whose continuous operation is advantageous for safety reasons, since a power steering pump, when switched off for a time, can only assist in a time-delayed manner in a steering operation.

There is known the practice of driving the clutch compressor directly through the drive engine and driving the power steering pump via the clutch compressor. Also known is the practice of driving the power steering pump through the drive engine and driving the clutch compressor via the power steering pump. In the case of clutch compressors, in particular, the torque shocks upon clutch engagement are very great, since there is no torque base load present during the disengaged phase of the clutch compressor, for which reason the drives are subjected here to particularly high peak moments.

It is disadvantageous in the case of these drive concepts that, in the case of a defect in which the drive of the ancillary assembly driven directly via the engine fails, the further ancillary assembly driven via this ancillary assembly fails likewise. This is particularly disadvantageous, since, for example, the simultaneous failure of the clutch compressor as an ancillary assembly and of the power steering pump as a further ancillary assembly corresponds to a braking failure with simultaneous loss of steering capability.

There is therefore needed an arrangement of a clutch compressor and power steering pump, wherein the failure of the one ancillary assembly does not automatically entail the failure of the other ancillary assembly and, at the same time, the transmission ratios for driving the clutch compressor and the power steering pump can be selected independently.

This need is met according to the invention by a vehicle having a drive shaft that is driven by an engine and that transmits torque generated by the engine to a first drive. The vehicle includes a clutch compressor and a power steering pump. The power steering pump is driven by an output shaft that transmits torque from the first drive to the power steering pump. A further output shaft, for driving the clutch compressor, is provided. The further output shaft is disposed on a second drive, to which torque is transmitted by the drive shaft that is driven by the engine. The further output shaft transmits torque from the second drive to the clutch compressor.

Expediently, it can be provided in this case that the first drive and the second drive differ. Both the first drive and the second drive are driven by the engine, such that the transmission of the torque to the power steering pump and to the clutch compressor occurs independently in each case in the first drive and the second drive. The failure of the first or second drive therefore does not interfere with the functioning of the ancillary assembly driven via the respectively other drive, such that a significant improvement in safety can be achieved. Moreover, it is possible for the transmission ratio to be selected dissimilarly between the engine and the power steering pump and the clutch compressor, the power steering pump, in particular, being able to be structurally optimized through an adapted displacement volume.

Alternatively, it can be provided that the second drive is identical to the first drive, and the further output shaft is disposed parallelwise in relation to the output shaft on the first drive. The transmission of the torque from the drive shaft to the output shaft and to the further output shaft is effected independently of one another. Likewise, in the case of this possibility for transmitting the torque of the engine to the two ancillary assemblies, a defect, for example of the output shaft driving the power steering pump, does not result in a disturbance of the functioning of the clutch compressor driven by the further output shaft, and vice versa. The transmission ratio likewise are freely selectable. In this way, the operational safety of the vehicle can also be improved. It is possible at the same time to structurally optimize the ancillary assemblies.

Advantageously, it can be provided that the clutch compressor is coupled to the further output shaft via a clutch that can be operated by a control device. Since the operation of the clutch compressor is necessary only when the pressure in a pressure vessel disposed in the vehicle drops below a predefined value, the complete switch-off of the clutch compressor by means of a clutch enables fuel to be saved without endangering the safety of the vehicle.

Expediently, it can be provided that the control device controls at least one further function of an air drier. Further control operations, usually controlled by a second control device, occur in connection with the preparation of compressed air in a vehicle, for example in the case of a regeneration operation of a desiccant used in an air drier. The integration of all functions connected with the clutch compressor and the air drier therefore allows the elimination of electronic components, since the second control device can be dispensed with.

Advantageously, it can be provided that a further control device is provided, which controls the power steering pump. Control operations that can be performed by a further electronic control device also occur in connection with the power steering pump. The further control device is thus independent of the control device that controls the clutch of the clutch compressor, such that a complete redundancy between the power steering pump and the clutch compressor is ensured.

Expediently, it can be provided that the further control device is operatively configured in such a manner that the further control device senses at least the output pressure of the power steering pump. The output pressure of the power steering pump can serve, for example, as a reference point for a defect.

Advantageously, it can be provided that the control device or the further control device is operatively configured in such a manner that the control device or the further control device senses the speed of the vehicle. From the sensed speed of the vehicle, the further control device can infer the output pressure of the power steering pump.

In particular, it can be provided in this case that the further control device is suitable for adapting the displacement volume of the power steering pump in dependence on vehicle speed. The varying of the displacement volume of the power steering pump allows the pressure provided by the power steering pump to be regulated independently of the engine rotational speed. An optimum regulation of the pressure provided by the power steering pump is achievable through superimposition of both adaptation possibilities.

Expediently, it can be provided that the control device and the further control device are operatively configured in such a manner that at least error messages are exchanged between the control device and the further control device. An adapted operation, i.e. an emergency operation, in which all functions of the ancillary assembly not affected by a defect might no longer be available, in order to increase the safety or to fulfill legal requirements, can thus be realized.

Advantageously, it can be provided that the control device is operatively configured in such a manner that the control device calculates switch-off sequences and switch-off pressures for the clutch compressor from the speed of the vehicle.

The complete switch-off of the clutch compressor through the clutch when there is an adequate reserve of compressed air allows a maximum saving of fuel during the operation of the vehicle. Since the quantity of air delivered can be inferred from the vehicle speed, synchronization of the air delivery phases of the clutch compressor with expected thrust phases of the engine can be achieved. The utilization of a thrust phase of the engine as an air delivery phase of the clutch compressor is particularly favorable in respect of energy, since fuel is scarcely used in the thrust phases.

Expediently, it can be provided that the further control device is operatively configured in such a manner that the further control device calculates a power steering pressure and the necessary power steering transmission ratio from the speed of the vehicle, an adaptation of the displacement volume of the pump being able to be effected. Both the expected and the required power steering pressure can be inferred from the speed of the vehicle. Thus, for example, a defect of the power steering pump can be detected.

The invention also includes a method for controlling a power steering pump and a clutch compressor in that torque is transmitted from the drive shaft driven by the engine to a second drive, and the clutch compressor is driven by a further output shaft disposed on the second drive.

On this basis, the advantages and particularities of the system according to the invention are also realized by the method for controlling the system.

The method can be developed, advantageously, in that at least error messages are exchanged between a control device that controls a compressor clutch and a further control device that controls the power steering pump.

Furthermore, it can be provided that the control device or the further control device senses the speed of the vehicle.

Expediently, it can be provided that the control device calculates switch-off sequences and switch-off pressures for the clutch compressor from the speed of the vehicle.

Furthermore, it can be provided that the further control device calculates a power steering pressure from the speed of the vehicle.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 is a schematic side view of a gearwheel drive, and

FIG. 4 shows the time characteristic of the torque take-up of two differing energy saving systems for clutch compressors.

DETAILED DESCRIPTION OF THE DRAWINGS

In the following drawings, parts that are the same or of the same type are denoted by the same references.

Figure 1:
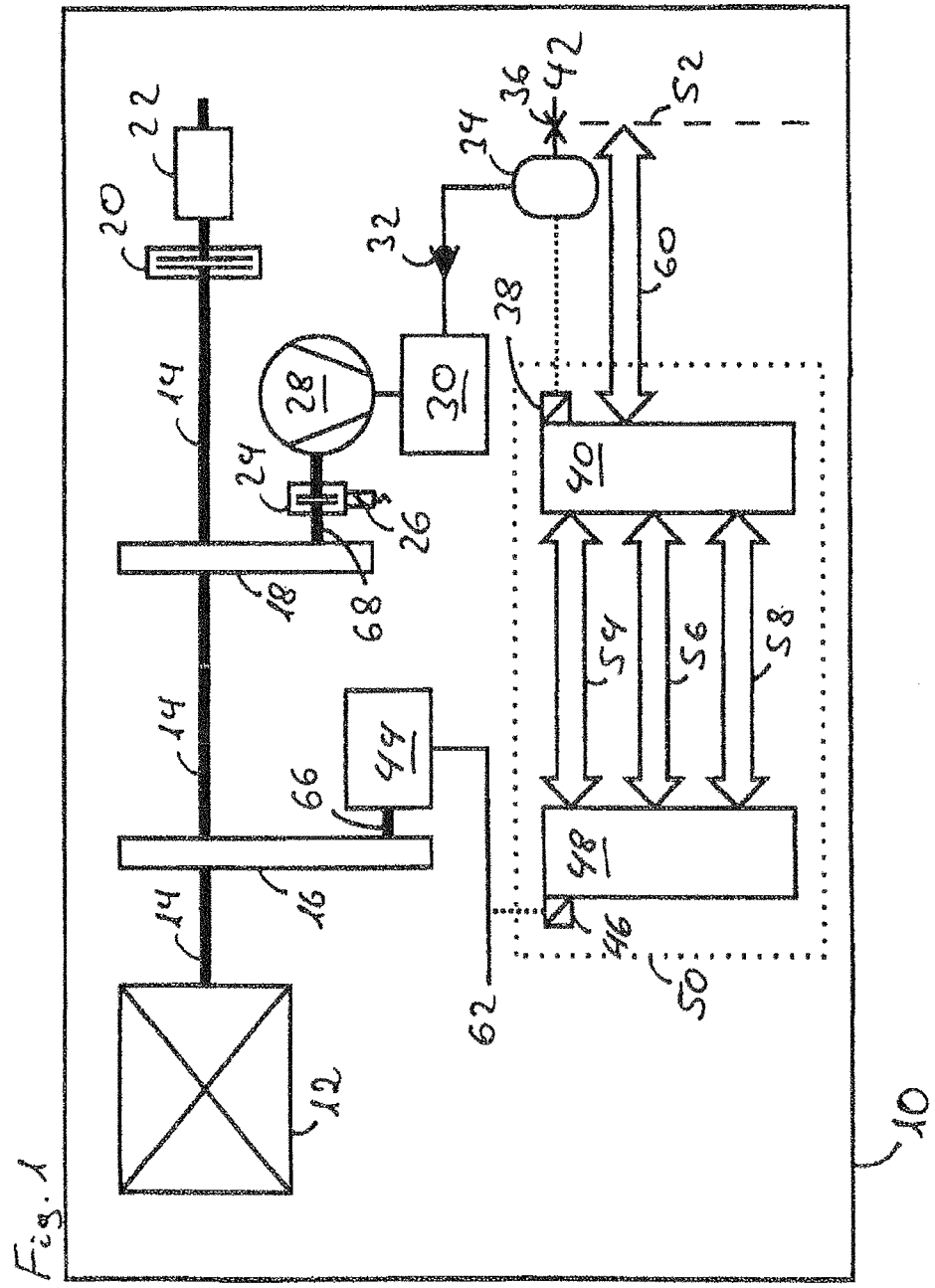
FIG. 1 is a schematic representation of a vehicle having an engine and ancillary assemblies, and the associated control devices.
Figure 2:
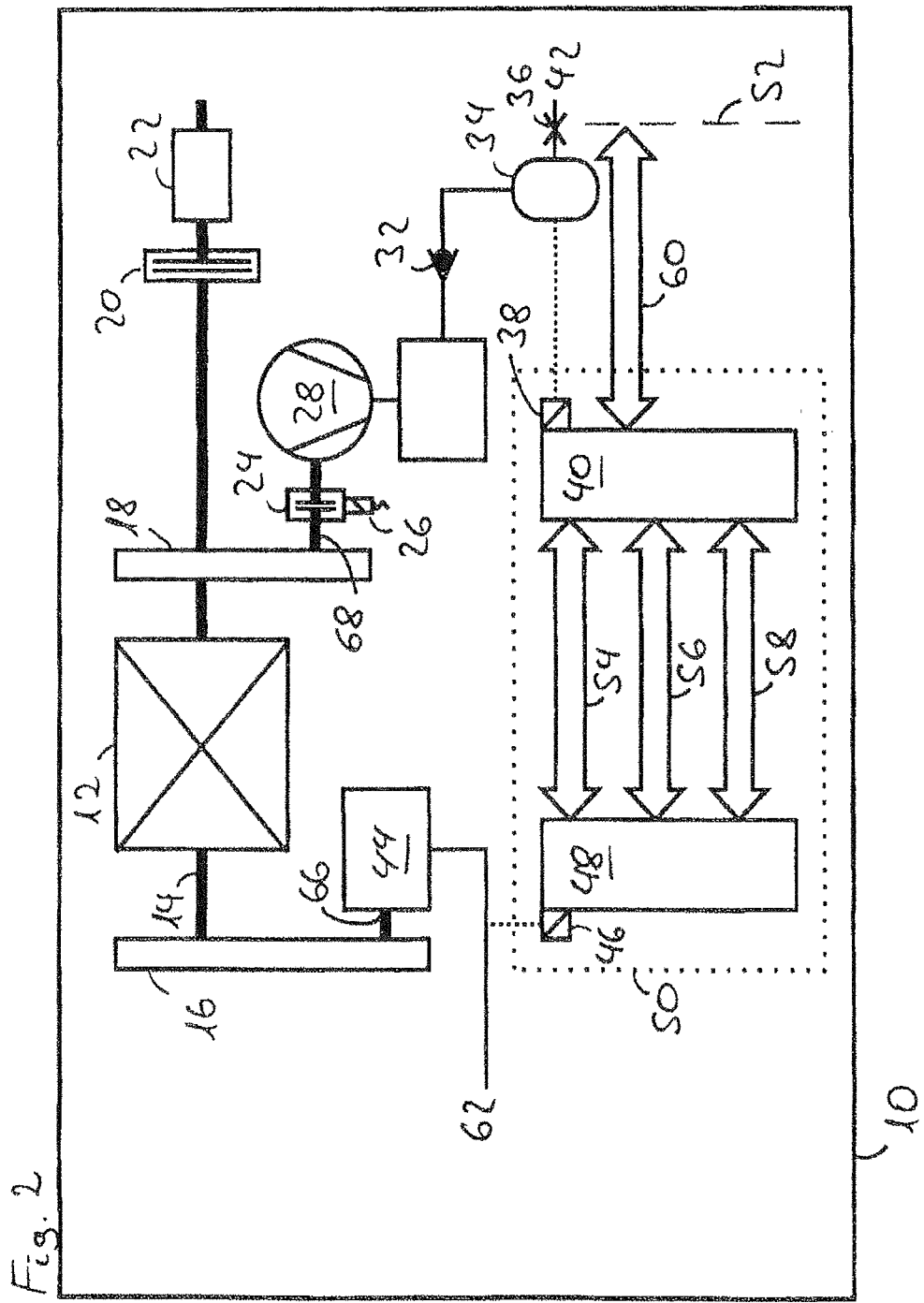
FIG. 2 shows a further schematic representation of a vehicle having an engine and ancillary assemblies, and the associated control devices.

FIGS. 1 and 2 are schematic representations of a vehicle having an engine and ancillary assemblies, along with associated control devices. An engine 12, which transmits torque to a transmission 22 via a drive shaft 14 and a clutch 20, is disposed in a vehicle 10. The transmission 22 is furthermore connected to means, not represented, which realize the mechanical propulsion of the vehicle 10. A first drive 16 and a second drive 18 are disposed on the drive shaft 14. The first drive 16 and the second drive 18 can be, for example, a gearwheel drive, a belt drive, having a toothed belt, or a chain drive, having a control chain.

The drive shaft 14 transmits torque from the engine 12 to the first drive 16 and to the second drive 18. Furthermore, disposed on the first drive 16 is an output shaft 66, which takes torque out of the first drive 16 and drives a power steering pump 44. Disposed on the second drive 18 there is a further output shaft 68, which takes up torque from the second drive 18 and drives a clutch compressor 28 via a compressor clutch 24. The compressor clutch 24 and an air drier 30 are controlled by a control device 40, and the power steering pump 44 is controlled by a further control device 48.

The control device 40 and the further control device 48 exchange between them information relating to an engine rotational speed 54, a vehicle speed 56 and an error status 58, additional information also being obtainable via a connection 52 to the CAN bus. The vehicle speed, for example, is first determined by the tachograph or wheel rotational-speed sensors, obtained by one of the two control devices 40, 48 via the connection 52 and then exchanged between them. The vehicle speed then serves, for example, together with further information such as the engine rotational speed, for control of the clutch compressor by the control device 40, or for determination of the required/provided power steering pump pressure by the further control device 48.

The two control devices 40, 48 can also be realized as a combined control device 50, although complete redundancy is to be observed in case of error. The further control device 48 controls the functions associated with the power steering assistance, and can switch off the power steering assistance, for example when the vehicle is at high speed. At least one of the control devices 40, 48 obtains information in respect of an engine torque 60 via the connection 52 to the CAN bus of the vehicle 10. The engine torque 60 can be used, for example, to detect thrust phases of the engine 12.

Via a connection 62, the power steering pump 44 provides hydraulic pressure for a power assisted steering, a pressure sensor 46 sensing the pressure provided by the power steering pump 44 and transmitting it to the further control device 48. The clutch compressor 28 can be completely deactivated by the compressor clutch 24, which can be operated by a solenoid valve 26. The solenoid valve 26 can be operated by the control device 40.

The clutch compressor 28 generates compressed air, which is treated in an air drier 30 and stored in a high-pressure vessel 34 disposed behind a non-return valve 32. The pressure present in the high-pressure vessel 34 is sensed by a pressure sensor 38 and transmitted to the control device 40. Downstream from a restrictor 36, the treated compressed air is forwarded, via a compressed air connection 42, to the individual consumers, which are not represented in the figures. An essential difference between FIGS. 1 and 2 is the disposition of the first drive 16 and of the second drive 18 on the drive shaft 14 in respect of the engine 12.

The compressor clutch 24 enables the clutch compressor 28 to be converted to an energy-saving state, the functioning of the power steering pump 44 being unaffected. Furthermore, a defect in the first drive 16 has no effect on the functionality of the clutch compressor 28, and a defect in the second drive 18 has no effect on the functionality of the power steering pump 44. The power steering pump 44 and clutch compressor 28 are thus driven parallelwise in a redundant manner, for which reason the steering capability is retained in the case of a braking failure resulting from a lack of compressed air and, conversely, the braking capability also remains ensured in the case of a failure of the power steering assistance.

FIG. 3 is a schematic side view of a gearwheel drive. Via toothed wheels 64, 70, 72, the drive shaft 14 drives the output shaft 66 and the further output shaft 68 parallelwise in relation to one another. In this case, the first toothed wheel 64 is connected to the drive shaft 14 in a rotationally fixed manner, the second toothed wheel 70 is connected to the output shaft 66 in a rotationally fixed manner, and the third toothed wheel 72 is connected to the further output shaft 68 in a rotationally fixed manner. In the case of a defect of the represented drive 16, usually either the second toothed wheel 70 or the third toothed wheel 72 would break, for which reason the drive of the respectively other output shaft would be secured. The first toothed wheel 64, which takes torque from the drive shaft 14 into the drive 16, will not break, since the positive tooth engagement factor imparts a greater toothed wheel stability to the driving toothed wheel 64. In the represented drive 16, the output shaft 66 and the further output shaft 68 are disposed parallelwise in relation to one another. The representation thus corresponds to the case wherein the second drive is identical to the first drive 16. The size of the second toothed wheel 70 and of the third toothed wheel 72 can be freely selected, independently of one another, such that differing transmission ratios can be realized for the power steering pump and the clutch compressor.

FIG. 4 shows the time characteristic of the torque take-up of two differing energy saving systems for clutch compressors. In this case, the horizontal axis corresponds to the time t, while the vertical axis corresponds to the torque M taken up. Shown in FIG. 4a is the torque take-up of a clutch compressor that is switched periodically between an air delivery phase and a relieved state. In the relieved state, the movable parts of the clutch compressor rotate concomitantly, but no compressed air is generated. In FIG. 4b, a clutch compressor is switched periodically between an air delivery phase and a switched-off state. In this case, a clutch located upstream of the clutch compressor opens, such that only a part of the output shaft driving the clutch compressor still takes up torque in the switched-off state. Owing to the lesser torque take-up of the clutch compressor in the switched-off state, a saving in energy results.

TABLE OF REFERENCE NUMERALS
10 vehicle
12 engine
14 drive shaft
16 first drive
18 second drive
20 clutch
22 transmission
24 compressor clutch
26 solenoid valve
28 clutch compressor
30 air drier
32 non-return valve
34 high-pressure vessel
36 restrictor
38 pressure sensor
40 control device
42 compressed air connection
44 power steering pump
46 pressure sensor
48 further control device
50 combined control device
52 connection
54 engine rotational speed 56 vehicle speed
58 error status
60 engine torque
62 connection
64 first toothed wheel
66 output shaft
68 further output shaft
70 second toothed wheel
72 third toothed wheel The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle having an engine for generating torque, the vehicle comprising:
    a drive shaft driven by the engine, the drive shaft transmitting torque generated by the engine;
    a first drive receiving the transmitted torque from the drive shaft;
    a clutch compressor;
    a power steering pump;
    a first output shaft transmitting torque from the first drive to the power steering pump;
    a second drive receiving the transmitted torque from the drive shaft; and
    a second output shaft for driving the clutch compressor, the second output shaft being disposed on the second drive and transmitting torque from the second drive to the clutch compressor.

2. The vehicle according to claim 1, wherein the first drive and the second drive differ.

3. The vehicle according to claim 1, wherein:
    the second drive is identical to the first drive; and
    the second output shaft is disposed in parallel to the first output shaft on the first drive, the transmission of the torque from the drive shaft to the first output shaft and to the second output shaft being effected independently of one another.

4. The vehicle according to claim 1, further comprising:
    a clutch operatively configured to couple the clutch compressor to the second output shaft; and
    a control device for operating the clutch.

5. The vehicle according to claim 4, further comprising:
    an air dryer arranged downstream of the clutch compressor, wherein the control device is operatively configured to control at least one further function of the air dryer.

6. The vehicle according to claim 4, further comprising:
    a second control device operatively configured to control the power steering pump.

7. The vehicle according to claim 6, wherein the second control device is operatively configured to sense at least an output pressure of the power steering pump.

8. The vehicle according to claim 6, wherein the control device or the second control device is operatively configured to sense a speed of the vehicle.

9. The vehicle according to claim 6, wherein the second control device is operatively configured for adapting a displacement volume of the power steering pump as a function of vehicle speed.

10. The vehicle according to claim 6, wherein the control device and the second control device are operatively configured to exchange error messages.

11. The vehicle according to claim 4, wherein the control device is operatively configured to calculate switch-off sequences and switch-off pressures for the clutch compressor from a speed of the vehicle.

12. The vehicle according to claim 6, wherein the second control device is operatively configured to calculate a power steering pressure from a speed of the vehicle.

13. A method for controlling a power steering pump and a clutch compressor in a vehicle having a drive shaft driven by an engine and transmitting torque generated by the engine to a first drive, wherein the power steering pump is driven by an output shaft transmitting torque from the first drive to the power steering pump, the method comprising the acts of:
    transmitting torque from the drive shaft driven by the engine to a second drive; and
    driving the clutch compressor via a second output shaft disposed on the second drive.

14. The method according to claim 13, further comprising the acts of:
    exchanging error messages between a control device operatively configured to control the clutch compressor and a second control device operatively configured to control the power steering pump.

15. The method according to claim 13, further comprising the act of sensing a speed of the vehicle via a control device.

16. The method according to claim 14, further comprising the act of sensing a speed of the vehicle via the control device or the second control device.

17. The method according to claim 16, further comprising the act of calculating switch-off sequences and switch-off pressures for the clutch compressor via the control device or the second control device as a function of the speed of the vehicle.

18. The method according to claim 16, further comprising the act of calculating a power steering pressure via the second control device as a function of the speed of the vehicle.

* * * * *